United States Patent [19]

Ray

[11] Patent Number: 5,614,712
[45] Date of Patent: Mar. 25, 1997

[54] METHOD OF ENGAGING THE SCANNING PROBE OF A SCANNING PROBE MICROSCOPE WITH A SAMPLE SURFACE

[75] Inventor: David J. Ray, Agoura Hills, Calif.

[73] Assignee: Quesant Instrument Corporation, Agoura Hills, Calif.

[21] Appl. No.: 409,999

[22] Filed: Mar. 24, 1995

[51] Int. Cl.$^6$ ............................................. H01J 37/28
[52] U.S. Cl. ......................... 250/307; 250/306; 73/105
[58] Field of Search ................................. 250/307, 306; 73/105

[56] References Cited

U.S. PATENT DOCUMENTS 5,262,643  11/1993  Hammond et al. ................ 250/306
5,414,690  5/1995  Shido et al. ....................... 250/306

*Primary Examiner*—Jack I. Berman
*Attorney, Agent, or Firm*—Marvin H. Kleinberg; Arant, Kleinberg, Lerner & Ram, LLP

[57] ABSTRACT

A method for initially positioning the scanning probe of a scanning probe microscope includes the steps of initially using fine position control to reduce the distance between probe and sample and, if the sample surface is not encountered, reversing the direction of the fine position control to an intermediate position and then using a coarse control in predetermined increments to narrow the distance between the probe and the sample. The fine control is again used and if the sample surface is not encountered, the steps are repeated until the surface is encountered so that the scanning operation can commence.

14 Claims, 3 Drawing Sheets

METHOD OF ENGAGING THE SCANNING PROBE OF A SCANNING PROBE MICROSCOPE WITH A SAMPLE SURFACE

The present invention relates to scanning probe microscopes, and, more particularly, scanning force microscopes, scanning tunneling microscopes as well as other types of probe microscopes. Scanning force microscopes are sometimes referred to as atomic force microscopes.

BACKGROUND OF THE INVENTION

Scanning probe microscopes (SPMs) are used to investigate the surfaces of matter in the micrometer, nanometer, and sub-Angstrom scale. Such microscopes operate by having a probe with a sharp tip located in near contact with a surface to be profiled. In the case of the scanning force microscope the tip may actually be in contact with the surface to be profiled.

With the tip in or nearly in contact with a surface, the probe microscope uses some phenomenon to sense the surface proximity. In the case of the scanning tunneling microscope (STM) a small bias voltage is applied between the tip and the sample. The amount of resulting "tunneling" current indicates the proximity of the surface to the probe tip. This current decreases exponentially as the tip-to-sample distance increases.

In the case of the atomic force microscope (AFM), the tip senses the interatomic forces present between the tip atoms and the surface atoms to provide an indication of the surface proximity to the tip. U.S. Pat. No. RE 33,387 describes such an AFM.

Atomic force microscopes typically have the probe tip mounted on a cantilever arm. The cantilever arm has such a small spring constant that typically one nanonewton of force will cause a detectable deflection. The cantilever arm then deflects due to atomic forces present between the tip and the sample. The probe may be either attracted to or repelled by the surface, depending upon the forces at work. When relative X and Y motion exits between the tip and sample surface, distance changes in Z will result when high or low surface features pass under the tip.

The tunneling microscope may use a current-to-voltage amplifier to convert the tunneling current to a suitable voltage. This voltage may then be subtracted from a constant voltage signal, referred to as the setpoint signal. This setpoint signal establishes the separation distance between the tip and the sample surface during the scan.

Typical prior art scanning force microscopes are described in U.S. Pat. Nos. 4,724,318 and 4,800,274. The prior art also teaches that either the sample or the probe may be attached to a movable positioning device, typically a piezoelectric cylinder, which can move either the sample or the probe back and forth in the X and Y directions to create a relative rastering motion as between the probe tip and sample surface. Further, as the tip traverses over the surface in the X and Y directions, the tip may be raised and lowered in order to keep it either at a nearly constant distance from the surface or resting on the surface at a nearly constant force. This is accomplished by using the signals generated by the cantilever arm deflection and a device for detecting cantilever deflection. Control of the Z direction, or height is made possible by using a servo control device such as is shown and described in U.S. Pat. No. 4,954,704, in which a method of accomplishing this control is taught.

Unfortunately the fine motion positioning device ordinarily has a very limited vertical range, typically on the order of 25 micrometers or less. Also, in order to obtain maximum dynamic range, it is desirable that the fine motion controller be positioned at the desired distance from the sample surface when the fine motion controller is at its midrange position.

The vertical position of the probe is controlled to be the point where the detection device outputs a signal whose magnitude is equal to a setpoint signal. A servo system then creates an error signal which is the difference between the setpoint value and the detector signal. The servo system creates a control signal which is applied to the fine motion control device such that the control device maintains the probe at a constant distance from the surface. Consequently, the distance between the probe tip and the sample surface remains essentially constant even though the topography of the sample under the probe tip is changing. The correction signal then represents the surface profile.

In scanning probe microscopes a "coarse approach" system is typically used to bring the probe sufficiently close to the sample surface so that the fine motion positioner is within its vertical range. U.S. Pat. No. 4,999,495 shows coarse and fine positioning devices. The coarse approach system may include a tripod in which the legs are threaded into the housing of either the fine motion controller or the sample holder. One or more legs are then rotated such that the distance between the probe and the sample surface is reduced as described in U.S. Pat No. 5,103,095. Another coarse approach system is described in U.S. Pat No. 5,325,010. In this patent, three legs are deformed slowly and then rapidly straightened. Since the legs are on circular ramps, this effectively changes the distance between the probe and the sample. Alternatively, probe microscopes may use a single, fine pitch screw to decrease the distance between the sample and the probe such as is described in U.S. Pat. No. 4,877,957.

In the devices described above, the approach method sets the fine motion controller at its midrange and then activates the coarse approach mechanism until the detector output value reaches the setpoint value. In this prior art method, there is always the danger that the coarse approach mechanism will not stop when the detector signal reaches the setpoint value. This may be due to inertial effects or delays in the mechanical or electrical components.

In other scanning force microscopes, the fine position control mechanism may be used to modulate or vary the force applied by the probe tip to the sample surface. Such a device is described in U.S. Pat. No. 5,237,859.

SUMMARY OF THE INVENTION

It is, therefore, an object of the present invention to provide a method of bringing the probe into proximity with the sample surface such that the tip does not touch or come closer to the surface than the setpoint allows.

It is a further object of the invention to provide a system in which the force applied by the tip to the surface is no greater than that established by the setpoint.

It is yet a further object of the invention to bring the probe adjacent to the surface such that the setpoint value is reached when the fine motion positioning device is substantially at its midpoint range.

It is an additional object of the invention to bring a probe from an initial position to the surface time such that the setpoint value is reached when the fine motion positioning device is substantially at its midpoint range in the shortest possible time.

These and other objects are achieved by a method of coordinating the control of both the coarse approach and fine approach mechanisms. This is accomplished by advancing the fine motion control positioner to the full extent of its dynamic range, toward the surface of the sample. Based on the detector output when the probe is fully extended and, depending on the range of both the coarse and fine positioners, the coarse positioner may then be advanced in either large or small incremental steps. Additionally, if the detector output indicates the probe is too close to the sample surface, the coarse positioner retracts.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DETAILED DESCRIPTION OF THE DRAWINGS

Figure 1:
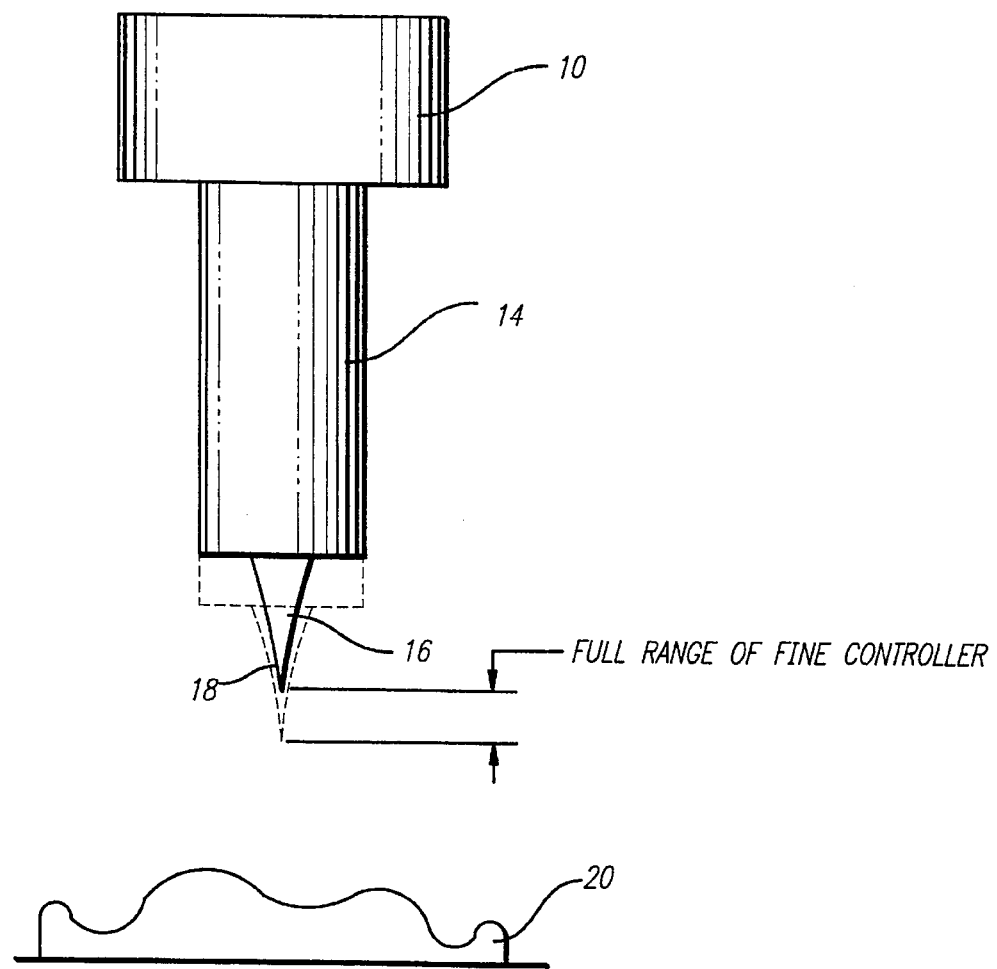
FIG. 1 is a diagram which shows the constituent parts of the approach mechanism of a scanning probe microscope.

Referring to FIG. 1, a scanning probe microscope (not shown) has a coarse positioner 10 coupled to a fine positioner 14. The probe 16 is, in turn, coupled to the fine positioner 14 with the tip 18 of the probe 14 poised at some distance above a sample surface 20. The fine positioner 14 has a limited extension range as shown. In order for the scanning probe microscope to operate, the probe tip 18 must be brought to within a few atomic diameters of the surface 20. It is the purpose of the coarse positioner 10 to bring the fine positioner 14 and probe tip 18 near enough to the surface 20 such that the surface is within the operating range of the fine positioner 14. Preferably, the probe tip 18 is positioned such that the sample surface 20 is at the midpoint of the limited extension range of the fine positioner 14.

While in the preferred embodiment, the probe tip is moved by the fine and coarse positioning means, in alternative embodiments, the distance between the probe tip and the sample can be adjusted by moving the sample with the fine positioning means, the coarse positioning means or both.

Figure 2:
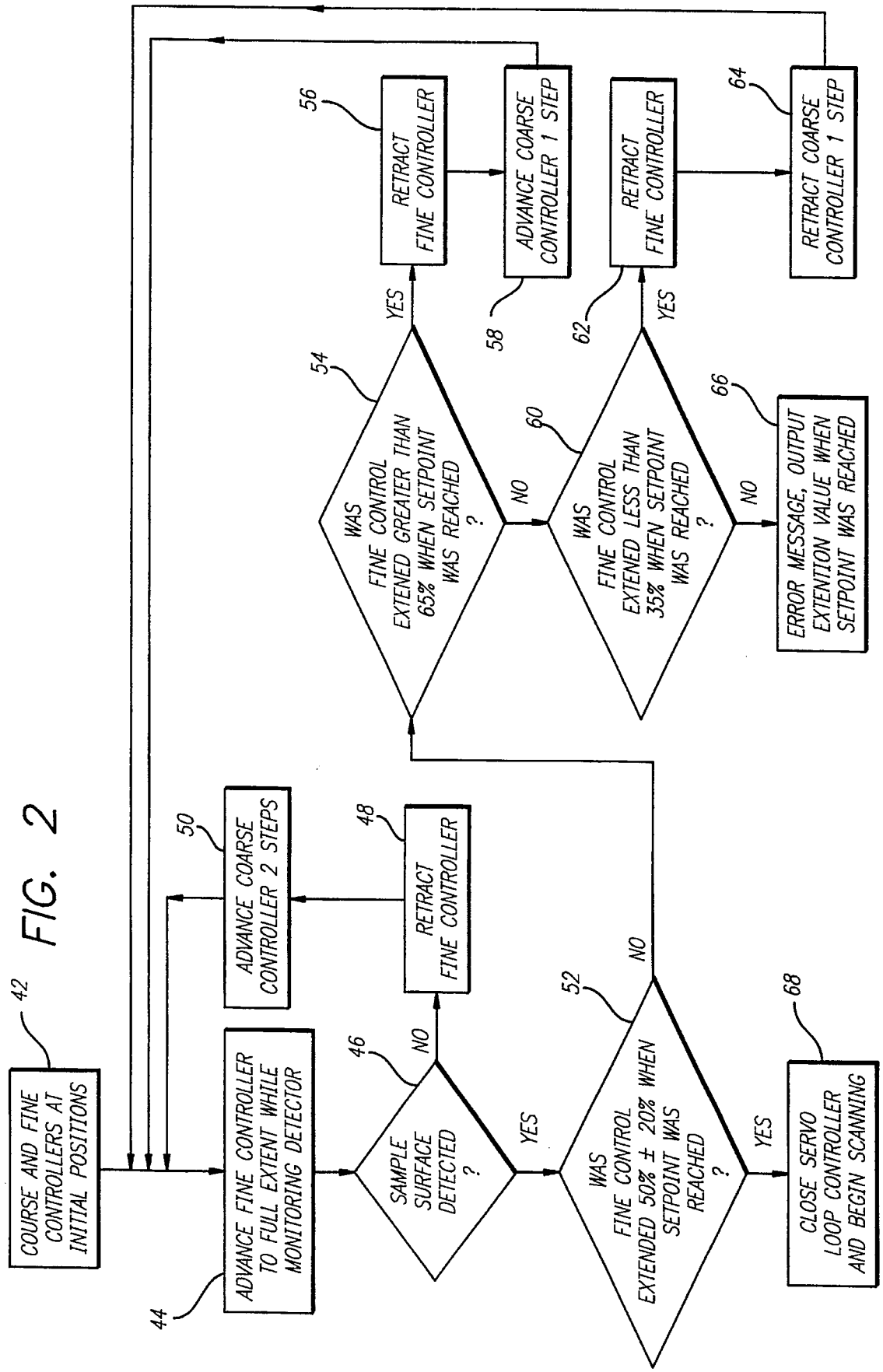
FIG. 2 is a logic diagram of one preferred embodiment of the invention as applied to a scanning probe microscope.

FIG. 2 is a logic diagram which illustrates the sequence of movements and decisions of a preferred embodiment of the invention. Block 42 indicates both the coarse and fine positioners 10, 14 are at some initial position well above the sample surface 20. As shown in block 44, the fine positioner 14 begins to extend to its full range while constantly monitoring the detector output to determine if the probe tip 18 is near the sample surface 20.

If the probe tip 18 then reaches the full extent of the fine positioner 14 range and the detector output has not yet reached the setpoint value, then the sample surface has not yet been detected, decision block 46 answers "no" and the fine positioner 14 retracts fully as shown in block 48. The coarse positioner 10 then advances 2 steps, as shown in block 50, and the process returns to block 44 to repeat the cycle. The cycle is repeated until decision block 46 answers "yes". At this point decision block 52 determines if the fine positioner 14 is near its midrange (i.e 50% extended) when the detector output matches the setpoint value. If the decision is "no", the extension of the fine positioner 14 is tested by decision block 54 to determine if the extension is too great (i.e. greater than 65% in this example). If the answer from block 54 is "yes", then the fine positioner 14 retracts fully per block 56 and the coarse positioner 10 advances by one step.

The method now requires that the cycle return to block 44 and repeat the cycle. If the result of decision block 54 had Deen "no", then the fine positioner 14 extension is tested to determine if the fine positioner 14 was only slightly extended (less than 35% in this example) when the detector output reached setpoint value. If, in this case the decision block 60 answers "yes", the fine positioner then retracts fully and the coarse positioner 10 retracts one step as required by block 64. The process then repeats by returning to block 44.

If both decision blocks 54 and 60 answer "no", then an error has occurred and this fact is flagged to the system according to block 66. However, if the decision of block 52 is "yes", then the system is ready to turn control of the mechanism to the servo-loop and the microscope is ready to begin scanning the sample surface 20 as determined by block 68.

Figure 3:
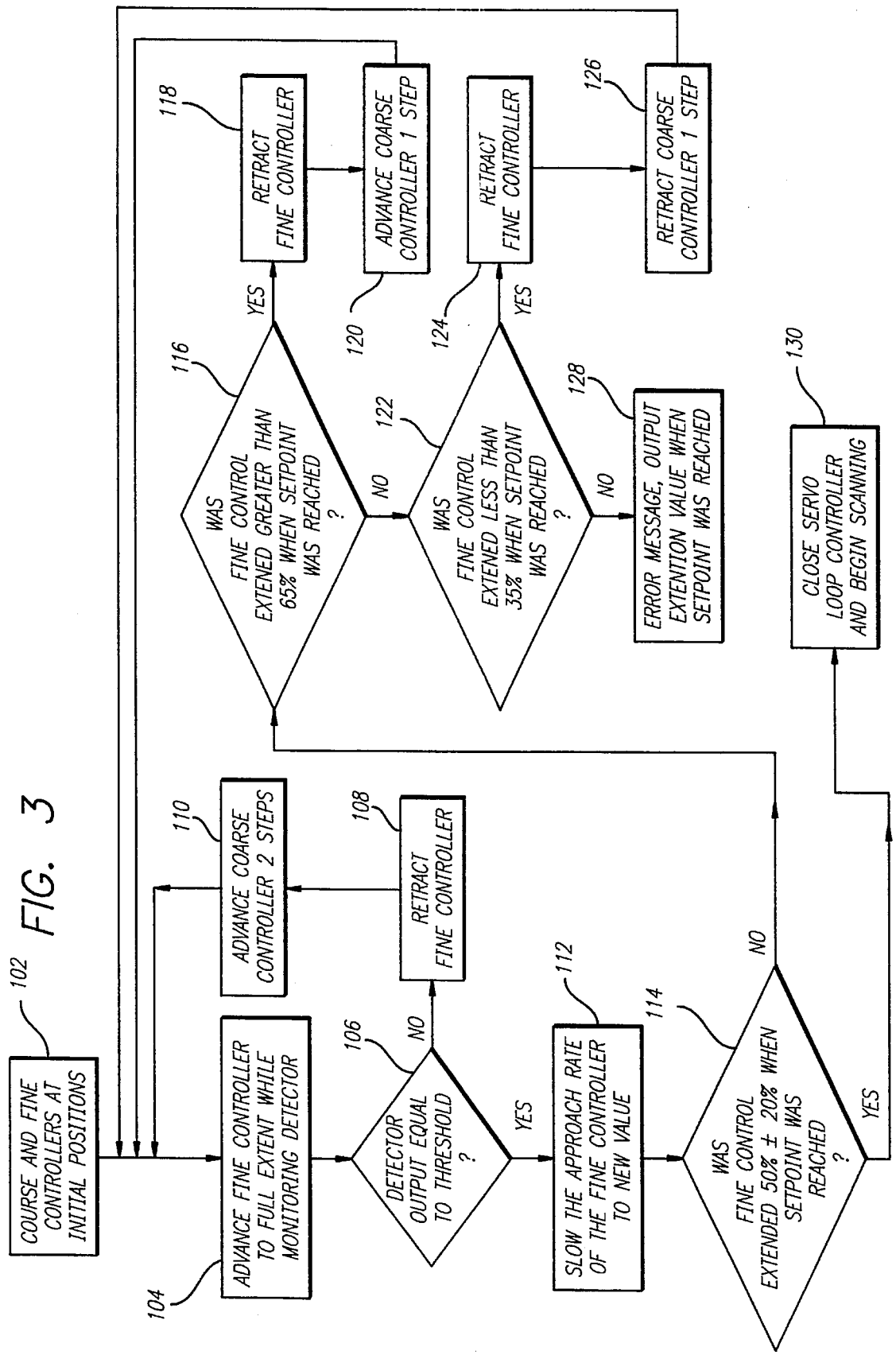
FIG. 3 is a diagram of a second, alternative method of the invention as applied to a scanning probe microscope.

FIG. 3 is a logic diagram which shows a second, alternative method of implementing the present invention. In this version, block 102 indicates both the coarse and fine positioners 10, 14 are at some initial position well above the sample surface 20. As shown in block 102, the fine positioner 14 begins to extend to its full range while constantly monitoring the detector output to determine if the probe tip 18 has reached a predetermined threshold distance, the signal value for which is less than the setpoint value.

If the probe tip 18 reaches the full extent of the fine positioner 14 range and the detector output has not yet reached the threshold value then decision block 106 answers "no" and the fine positioner 14 retracts fully as shown in block 108. The coarse positioner 10 then advances 2 steps, as shown in block 110 and the process returns to block 104 to begin the cycle again. The cycle is repeated until decision block 106 answers "yes". At this point, block 112 slows the fine approach mechanism to a predetermined value which results in an approach speed that is slower than the normal fine positioner approach speed. This brings the probe tip 18 to the proper point (determined by the setpoint value) at the slowest speed consistent with the wishes of the operator.

When the detector output does reach the setpoint, control is passed to decision block 114 which determines if the fine positioner 14 is near its midrange (50% extended) when the detector output matches the setpoint value. If the decision is "no", the extension of the fine positioner 14 is tested by decision block 116 to determine if the extension is too great (i.e. greater than 65% in this example). If the answer is "yes" from block 116, then the fine positioner 14 retracts fully per block 118 and the coarse positioner 10 advances one step per block 120. The method now requires that the cycle return to block 102 and repeat the cycle.

If the result of decision block 116 had been "no", then the fine positioner 14 extension is tested to determine if the fine positioner 14 was only slightly extended (less than 35% in this example) when the detector output reached setpoint value. If, in this case, the decision block 122 answers "yes", the fine positioner 14 retracts fully per block 124 and the coarse positioner 10 retracts one step per block 126. The process then repeats by returning to block 102.

If both decision blocks 116 and 122 answer "no", then an error has occurred and this fact is flagged to the system per block 128. However, if the decision of block 114 is "yes", then the system is ready to turn control of the mechanism to the servo-loop and the microscope is ready to begin scanning the sample surface 20 per block 130.

In the examples shown, the percentage of the extensions causing the decisions to yield "yes" or "no" were used for illustrative purposes only. Clearly, this method can be used successfully with different values. Additionally, the threshold and the approach speeds may be preset or adjusted by the operator of the microscope.

In prior art variations of atomic force microscopes, the cantilevered portion of the probe may be intentionally excited into resonance by signals to the motion positioner. In this case, as the probe tip 18 is brought near the surface 20, the resonance parameters change and these changes may be used to generate the signal which is sent to the feedback loop servo controller. The method of approaching the sample surface described herein will work with microscopes in which the cantilever is excited into resonance.

This form of the prior art, however does have advantages since the topology of the surface may be measured with less lateral force on the tip. Consequently, with some samples, the resultant image is a more accurate representation of the surface. The reduced lateral force results from the fact that the tip is momentarily pulled away from the surface during one half of the oscillatory cycle. Should the tip encounter a steep vertical feature on the sample surface, it does not experience as much lateral force since it is further away from the surface.

Others skilled in the art may devise different and alternative embodiments within the scope of the present invention. Accordingly, the invention should be limited only by the scope of the claims presented below.

What is claimed as new is:

1. A method of controlling the distance between the probe of a scanning probe microscope device and a sample, the microscope device including a probe tip, a detector, a servo-loop, fine position control means, and coarse position control means which move the probe tip in predetermined increments, such that the probe tip is brought near enough to a surface for the control servo-loop of the microscope to be within its control range, the method comprising the steps of:
   a. decreasing the distance between the probe tip and the surface using the fine position control mechanism while monitoring the detector output;
   b. increasing the distance between the probe tip and the sample using the fine position control means if, during step a, the detector does not output a signal whose value equals a threshold value;
   c. decreasing the distance between the probe tip and the surface by more than one increment of coarse distance using the coarse position control means;
   d. repeating steps a., b., and c. until the detector output reaches the threshold value during step a.; and
   e. determining the percentage of full range of fine control distance extended at this time.

2. The method of claim 1 wherein the direction of the movement of the coarse position control is a function of the value of the detector output as it is compared to the setpoint value.

3. The method of claim 1, further including the steps of:
   increasing the distance between the probe tip and the sample using the fine position control means if the percentage of full range of fine control distance is greater than a predetermined percentage; and
   decreasing the distance between the probe tip and the surface by one increment of coarse position distance using the coarse position control means.

4. The method of claim 3, further including the step of decreasing the distance between the probe tip and the surface using the fine position control mechanism while monitoring the detector output until the detector output reaches the threshold value.

5. The method of claim 1, further including the step of:
   terminating the positioning operation if the percentage of full range of fine control distance is less than a predetermined percentage.

6. A method of moving the probe of a scanning probe microscope device including a probe tip, a detector, a servo-loop, fine position control means, and coarse position control means which move the probe tip in predetermined increments such that the probe tip is brought sufficiently near a surface that the servo-loop of the microscope is within its control range, the method comprising the steps of:
   a. reducing the distance between the probe tip and the surface with the fine position control means while monitoring the detector output;
   b. increasing the distance between the probe tip and the surface with the fine position control means if the detector does not output a value equal to a predetermined threshold value during step a.;
   c. reducing the distance between the probe tip and the surface by more than one coarse distance increment with the coarse position control means;
   d. repeating steps a., b. and c. until the detector output reaches said threshold value during step a.;
   e. reducing the approach speed of the fine position control means when the detector output reaches said threshold value;
   f. stopping the fine approach control means when the detector output signals that the sample surface has been detected during step a.; and
   g. determining the percentage of full range of fine control distance extended at this time.

7. The method of claim 6 wherein the sample is moved to and from the probe tip by the fine position control means.

8. The method of claim 7 wherein the coarse control position means moves the probe tip.

9. The method of claim 6 wherein the fine control position means moves the probe tip to and from the sample.

10. The method of claim 9 wherein the sample is moved to and from the probe tip by the coarse position control means.

11. The method of claim 9 wherein the coarse control position means moves the probe tip to and from the sample.

12. The method of claim 6, further including the steps of:
   increasing the distance between the probe tip and the sample using the fine position control means if the percentage of full range of fine control distance is greater than a predetermined percentage; and
   decreasing the distance between the probe tip and the surface by one coarse distance increment using the coarse position control means.

13. The method of claim 12, further including the step of decreasing the distance between the probe tip and the surface using the fine position control mechanism while monitoring the detector output until the detector output reaches the threshold value.

14. The method of claim 6, further including the step of: terminating the positioning operation if the percentage of full range of fine control distance is less than a predetermined percentage.

* * * * *